(12) United States Patent
Simmons et al.

(10) Patent No.: US 7,527,250 B2
(45) Date of Patent: May 5, 2009

(54) COMPOSITE MATERIAL

(75) Inventors: Martin Simmons, Cambridge (GB); Kilian O'Byrne, Cambridge (GB)

(73) Assignee: Hexcel Composites, Ltd., Duxford, Cambridge (GB)

( * ) Notice: Subject to any disclaimer, the term of this patent is extended or adjusted under 35 U.S.C. 154(b) by 345 days.

(21) Appl. No.: 11/450,995

(22) Filed: Jun. 12, 2006

(65) Prior Publication Data

US 2007/0087202 A1    Apr. 19, 2007

(30) Foreign Application Priority Data

Jun. 18, 2005    (GB) ................ 0512610.7

(51) Int. Cl.
*F16F 1/368* (2006.01)
*F16F 1/366* (2006.01)
*B32B 27/04* (2006.01)
*B32B 27/20* (2006.01)

(52) U.S. Cl. .................... 267/36.1; 428/297.4; 428/413
(58) Field of Classification Search ................ 523/440, 523/443, 466; 428/297.4, 413, 414, 415, 428/417; 267/36.1; 977/778, 783, 785

See application file for complete search history.

(56) References Cited

U.S. PATENT DOCUMENTS

| | | | |
|---|---|---|---|
| 4,923,910 A | | 5/1990 | Kitigawa et al. |
| 5,648,407 A | | 7/1997 | Goetz et al. |
| 6,429,157 B1 * | | 8/2002 | Kishi et al. ................. 442/227 |
| 6,627,704 B2 * | | 9/2003 | Yeager et al. ............... 525/391 |
| 6,812,276 B2 * | | 11/2004 | Yeager ........................ 524/495 |
| 7,235,192 B2 * | | 6/2007 | Yeager et al. ............... 252/500 |
| 2001/0053820 A1 * | | 12/2001 | Yeager et al. ............... 525/186 |
| 2003/0039812 A1 | | 2/2003 | Tsai et al. |
| 2003/0096123 A1 * | | 5/2003 | Yeager ........................ 428/461 |
| 2004/0106750 A1 * | | 6/2004 | Yeager et al. ............... 525/502 |
| 2005/0048291 A1 | | 3/2005 | Woo et al. |
| 2005/0048700 A1 | | 3/2005 | Rubinsztajn et al. |

FOREIGN PATENT DOCUMENTS

| | | |
|---|---|---|
| EP | 0133282 A2 | 2/1985 |
| EP | 0379172 A2 | 7/1990 |
| EP | 1553125 A | 7/2005 |
| JP | 63-254122 A | 10/1988 |
| JP | 2001/335680 | 12/2001 |
| WO | WO 03/101164 | 12/2003 |
| WO | WO 2005/019195 | 3/2005 |
| WO | WO2005/108488 | 11/2005 |
| WO | WO2006/062891 | 6/2006 |

OTHER PUBLICATIONS

Karaki, et al., "Characterization of fatigue behavior of polynanomeric matrix composites", Technical paper presented at SAMPE 2004, May 16-20, 2004.
Technical Data Sheet, "NANOPOX XP 22/0516", Aug. 2002.
Koo, et al., "Polymer Nanostructure Materials for High Temperature Applications", SAMPE Journal, Mar./Apr. 2005.
Liu, et al., "Preparation and thermal properties of epoxy-silica nanocomposites from nanoscale colloidal silica", Polymer 44 (2003) 5159-5167.

* cited by examiner

*Primary Examiner*—Michael J Feely
(74) *Attorney, Agent, or Firm*—W. Mark Bielawski; David J. Oldenkamp

(57) ABSTRACT

Composite materials composed of a structural fibrous reinforcement and a matrix resin composition. The matrix resin composition includes at least one thermoset resin component, at least one curative component and at least one inorganic nano-scale particulate. The cured composite material exhibits a fatigue performance such that it achieves greater than 300,000 cycles under a flexural load of 850 MPa at 90° C.

10 Claims, No Drawings

COMPOSITE MATERIAL

BACKGROUND OF THE INVENTION

1. Field of the Invention

The present invention relates to a polymer matrix resin and a fiber reinforced composite material comprising said matrix.

2. Description of Related Art

Polymer resin matrices are known which have a moderate glass transition temperature (Tg) of around 125° C. These matrices may also demonstrate excellent fatigue properties at room temperature (RT) when combined with specific fibers to form a composite material. An example of one such matrix is HexPly® M10R which is available from Hexcel Composites Limited (Duxford, Cambridge, UK). The fatigue properties of such matrices will diminish as the service temperature increases from RT.

In some circumstances, for example in automotive applications, a matrix resin having a high Tg is desired which also demonstrates excellent fatigue properties at room and elevated temperatures when combined with specific fibers. An increase in Tg is typically achieved by increasing the crosslink density (1/Xn) of the cured matrix resin. However, an increase in 1/Xn adversely affects the inherent toughness of the matrix. The concomitant fatigue performance of the matrix resin when it is combined with specific fibers is thus, also adversely affected.

In an attempt to overcome this problem and to increase the toughness of the matrix resin, toughening components have been added to matrix resin compositions. While this does improve fatigue properties, other matrix resin properties such as Tg, strength and modulus tend to be adversely affected. Furthermore, processing conditions are made more severe as a result of an increase in matrix resin viscosity caused by the presence of additional tougheners. Therefore, improvements in fatigue performance have previously been achieved but at the expense of other physical and mechanical properties of the matrix and processing options.

Therefore, it is desirable to produce a matrix resin which has a high Tg i.e. around 150° C. and a composite material comprising said matrix which when cured has excellent fatigue properties at RT and elevated temperatures. For vehicle (i.e. cars, trucks and buses) leaf spring applications, 90° C. is a typical elevated temperature.

SUMMARY OF THE INVENTION

Thus, according to a first aspect of the present invention there is provided a matrix resin composition comprising at least one thermoset resin, at least one curative component and at least one inorganic nano-scale particulate. By "nano-scale particulate" we mean particulate material having a maximum diameter of less than 50 nm.

The relative ratios of ingredients in a resin formulation will be tailored to achieve a particular performance specification. Model formulations are described in the December 2001 publication ASM Handbook, Volume 21—Composites, pages 86-88.

A curative component, also known as a curing agent or hardener, is a reactive agent that, when added to a resin, causes polymerization. An accelerator is an ingredient that speeds up the polymerization process between the curative component and the resin.

The matrix resin composition of the present invention is particularly suitable for use in the preparation of a composite material. Thus, according to a second aspect of the present invention there is provided a composite material comprising a structural fibrous reinforcement and a matrix resin composition, the composition including at least one thermoset resin, at least one curative component and at least one inorganic nano-scale particulate such that, when cured, the material has enhanced fatigue performance in that it achieves greater than 300,000 cycles under a flexural load of 850 MPa at 90° C.

Therefore, according to a further aspect of the present invention there is provided a cured composite material achieving a fatigue performance of greater than 300,000 cycles when tested under a flexural load of 850 MPa at 90° C. obtainable by curing an assembly that includes a fibrous reinforcement and a matrix resin composition, the composition including at least one thermoset resin, at least one curative component and at least one inorganic nano-scale particulate. The cured composite is well suited for use as a vehicle leaf spring.

The above described and many other features and attendant advantages of the present invention will become better understood by reference to the following detailed description.

DETAILED DESCRIPTION OF THE INVENTION

The cured material of the present invention preferably achieves greater than 400,000 cycles under a flexural load of 850 MPa at 90° C. and most preferably achieves greater than 500,000 cycles under a flexural load of 850 MPa at 90° C.

The determination of the fatigue performance of the cured material of the present invention is achieved using a flexural load of 850 MPa (467+/−383 MPa) at a frequency of 20 Hz and at a test temperature of 90° C. The procedural steps for determining the fatigue performance are well known to those skilled in the art.

Advantageously, the cured composite material not only exhibits excellent fatigue performance but the matrix resin contained therein is such that a high Tg is achieved. Therefore, the present invention provides a cured composite material having a high Tg in combination with excellent fatigue properties at room and elevated temperatures, such that, other physical and mechanical properties of a cured prepreg assembly made with said resin are not compromised.

When cured, the matrix resin of the present invention preferably exhibits a Tg of greater than 100° C., more preferably greater than 120° C. and most preferably greater than 140° C. These values apply equally to a cured fiber reinforced composite material comprising the matrix resin of the present invention.

In order that the resin matrix exhibits a suitably high Tg, a multifunctional resin is added to the composition. Such a multifunctional resin increases the crosslink density of the cured matrix resin. An increase in crosslink density gives rise to an increase in the Tg of the cured resin matrix and therefore the cured composite material of which the resin matrix forms a part.

The thermoset resin may be selected from any of the following either alone or in combination: epoxy, epoxy novolak, cyanate ester, bismaleimide, phenolic, phenol novolak, vinyl ester, polyester, polyamide or benzoxazine. Preferably the thermoset resin comprises an epoxy resin or an epoxy resin together with at least one multifunctional epoxy resin. The epoxy resin may comprise an aromatic diglycidyl ether and/or an aliphatic diglycidyl ether.

Aromatic and aliphatic diglycidyl ethers suitable for use with the present invention may be solid, semi-solid or liquid such as to provide the necessary processing characteristics. Examples of suitable aromatic glycidyl ethers are the diglycidyl ether of bisphenol A, the diglycidyl ether of bisphenol F, the diglycidyl ether of bisphenol S, the diglycidyl ether of tetrabromo bisphenol A, the diglycidyl ether of tetrabromo bisphenol S, diglycidyl ethers of resorcinol and alkylated resorcinols, the diglycidyl ether of hydroquinone, diglycidyl ether of 2,5-di-tertiary butyl hydroquinone, the tetraglycidyl ether of 1,1-methylenebis(2,7-dihydroxynaphthalene), the diglycidyl ether of 4,4'-dihydroxy-3,3',5,5'-tetramethylbiphenyl, the diglycidyl ether of 1,6-dihydroxynaphthalene, the diglycidyl ether of 9,9'-bis(4-hydroxyphenyl)fluorene, and the diglycidyl ether of the reaction product of glycidol and butylated catechol. Examples of aliphatic glycidyl ethers are diepoxypropane, diepoxybutane, diepoxyhexane, diepoxyoctane, the diglycidyl ether of neopentyl glycol, the diglycidyl ether of cyclohexane dimethanol, vinyl cyclohexene dioxide, bis(2,3-epoxycyclopentyl)ether, dicyclopentanediepoxide, the diglycidyl ether of hydrogenated bisphenol A, bis(3,4-epoxycyclohexylmethyl) adipate.

Suitable epoxy material will preferably have a functionality of 2 and an epoxy equivalent weight (EEW) value in the range 6.1 to 0.26 equivalents/Kg. Particularly, preferred examples include Araldite GY280, Araldite LY15556SP and Araldite GT7071 which are all available from Huntsman (Duxford, UK).

Suitable multifunctional resins for use with the present invention include any of the following either alone or in combination: the tetraglycidyl derivative of diaminodiphenylmethane, tetraglycidyl derivative of 3,3'-diethyl-4,4'-diaminodiphenylmethane, the tetraglycidyl derivative of m-xylylenediamine, 1,3-bis (diglycidylaminomethyl) cyclohexane, triglycidyl-m-aminophenol and triglycidyl-p-aminophenol, the glycidyl ethers of the novolaks obtainable from phenol, cresol, bisphenol A, halogenated phenols, the triglycidyl ether of tris(p-hydroxyphenyl)methane, the tetraglycidyl ether of tetrakis(p-hydroxyphenyl)ethane, the triglycidyl ether of glycerol, the triglycidyl ether of trimethylolethane, the triglycidyl ether of trimethylolpropane, the tetraglycidylether of pentaerythritol and 3,4-epoxycyclohexylmethyl-3,4-epoxycyclohexanecarboxylate. The most preferred multifunctional resin is MY719 (tetraglycidyl-diaminodiphenylmethane) which is available from Huntsman (Duxford, UK).

Preferably, the curing component is an aliphatic, cycloaliphatic and/or aromatic amine that is solid at ambient temperature. Most preferably the curing component is a dicyandiamide, such as DYHARD®100, which is available from Degussa (Trostberg, Germany). The matrix resin composition may also include an accelerator, which is typically a urone.

Suitable accelerators for use with the present invention include any of the following either alone or in combination: N, N-dimethyl, N'-3, 4-dichlorophenyl urea (Diuron) or N, N-dimethyl, N'-3-chlorophenyl urea (Monuron), but preferably, N, N'-(4-methyl-m-phenylene)bis[N', N'-dimethylurea] (UR500). These are available from Degussa and sold under the aforementioned parenthesized trade names.

Surprisingly, it has been found that by including a nano-scale particulate in the resin composition of the present invention ensuing composite materials, once cured, exhibit excellent fatigue properties at room and elevated temperatures.

Additives suitable for use with the present invention include any nano-scale solid inorganic particles, in particular silica ($SiO_2$), barium sulphate ($BaSO_4$), antimony pentoxide ($SbO_5$) and alumina silicates ($AlSiO_3$) which may be used alone or in combination. The nano-scale particles may be added to the resin composition as a blend with other components or separately as an individual component.

In one embodiment of the present invention, the additive is introduced by way of commercially available solid filled epoxy resin, i.e., Nanopox F400 which is a silica filled bisphenol-A epoxy resin comprising 40% by weight silica. Nanopox F400 is available from Hanse Chemie (Geesthacht, Germany).

Nanopox F400 comprises a silica phase having epoxy functionalised $SiO_2$ nanospheres with an average particle size of 20 nm. Due to the agglomerate free colloidal dispersion of the nano-scale particles in the epoxy resin, Nanopox F400 has a relatively low viscosity despite the relatively high silica content.

The nano-scale particulate preferably constitutes less than 15% by weight of the resin matrix composition. The nano-scale particulate more preferably constitutes from 10 to 15% by weight of the resin matrix of the present invention and most preferably the nano-scale particulate most preferably constitutes less that 5% by weight of the resin matrix.

The resin matrix may comprise any of the following additional ingredients either alone or in combination: thermoplastics and core shell rubbers; flame retardants; wetting agents; pigments/dyes; UV absorbers; anti-fungal compounds; other fillers; toughening particles and viscosity modifiers.

The fibrous reinforcement of the assembly of the present invention may be composed of synthetic or natural fibers. Hybrid or mixed fiber systems may be envisaged. Suitable fibers include any of the following either alone or in combination: glass, carbon, graphite, ceramic or Aramid. Particularly, preferred fibers are those composed of carbon and glass fibers. The fibers may be in unidirectional form, or as non-wovens, such as multi-axial fabrics or non-crimped fabrics, or may be present as a woven fabric or non-woven mat or fabric or combinations thereof. Typical woven fabrics include plain, satin, twill and harness weave styles.

The mass of fibers within the fibrous reinforcement is typically in the range 80-4000 $g/m^2$, more preferably in the range 100-2500 $gm^{-2}$, and most preferably in the range 150-2000 $gm^{-2}$. For carbon based fibrous reinforcement materials the number of carbon filaments is in the range from 3000 to 320,000, more preferably in the range from 3000 to 160,000 and most preferably in the range from 3000 to 48,000. For fiberglass fibrous reinforcements, fibers in the range of from 600 to 2400 tex are particularly preferred.

The present invention also provides a method for the preparation of a composite material. Thus, according to a further aspect of the present invention there is provided a method for the preparation of a composite material that includes the steps of preparing a matrix resin composition including the steps of: preparing a premix including at least one thermoset resin together with at least one curative component, separately mixing any remaining resin components together with at least one nano-scale particulate to form a uniform blend, cooling the blend before adding the premix to the the uniform blend, cooling the ensuing matrix resin composition and applying the composition to a fibrous reinforcement material.

The resin matrix of the present invention may be applied to the fibrous reinforcement material in such a way as to either fully or partially impregnate the fibers. Alternatively, the resin matrix may be in the form of a separate layer that is in contact with the surface of the fibrous reinforcement, but which does not impregnate the reinforcement. The material, prior to curing, may include a plurality of layers such that the reinforcement is located there between or such that a second layer of resin matrix is applied to a first layer.

It is envisaged that the resin matrix described herein can be used in several ways to produce composite materials. For example, it may be utilized in direct processes such as Resin Transfer Molding (RTM) and Vacuum-assisted Resin Transfer Molding (VaRTM) in which the reinforcement material is placed in a mould and the resin is subsequently injected into the closed mould. The nano-size particulates do not filter out on the surface of the reinforcement fibers and are therefore uniformly distributed throughout the composite. Alternatively, composites can also be made via indirect processes. In this case the resin is made into an intermediate film form that can then be combined with reinforcement fiber to form a fully or partially impregnated prepreg that is subsequently placed in the mold and cured. Another variation of an indirect process is Resin Film Infusion in which the resin film and reinforcement are placed in the mould and the resin then flows under heat and pressure to impregnate the reinforcement. These manufacturing methods are well known to those skilled in the art.

Typically, the material referred to herein is cured at temperatures between 60° and 200° C., more preferably at temperatures between 70° and 160° C. and most preferably at temperatures between 70° and 140° C.

For the avoidance of doubt the details referred to herein apply to all relevant aspects of the inventions.

The present invention will now be described further by way of example only and with reference to the following example:

| Number | Component | Function | Loading (wt %) |
|---|---|---|---|
| 1 | GY280 | Epoxy resin | 29.6 |
| 2 | LY1556SP | Epoxy resin | 7.1 |
| 3 | MY719 | Multifunctional epoxy resin | 25.0 |
| 4 | GT7071 | Epoxy resin | 25.0 |
| 5 | Nanopox F400 | Additive | 6.25 (2.5% $SiO_2$) |
| 6 | DYHARD 100 | Curative | 4.7 |
| 7 | Monuron | Accelerator | 2.4 |

1. A semi-solid bisphenol-A resin available from Huntsman (Duxford, UK).
2. A liquid bisphenol-A resin available from Huntsman (Duxford, UK).
3. A multifunctional glycidyl amine available from Huntsman (Duxford, UK).
4. A solid bisphenol-A resin available from Huntsman (Duxford, UK).
5. A silica filled bisphenol-A epoxy resin available from Hanse Chemie (Geesthacht, Germany).
6. A curative designated dicyandiamide available from Degussa (Trostberg, Germany).
7. An accelerator designated N,N'-dimethyl-N'-3-chlorophenylurea available from Degussa (Trostberg, Germany).

The components referred to above were mixed as follows:

Step 1: Premix preparation procedure using a Hauschild DAC 400 FVZ speed mixer:
i) Charge LY1556SP and DYHARD 100 to mixer pot and blend using mixer.
ii) Charge Monuron to pot and blend using mixer.
Store premix at −18° C.

Step 2: Resin matrix preparation procedure using a 1 litre Molteni mixer:
i) Pre-heat GY280 and MY719 in an oven at 80° C.
ii) Charge GY280, MY719, GT7071 and Nanopox F400 to a pot, load pot into mixer and heat to 120° C. Mix until blend is uniform.
iii) Cool the mixture to 50° C.
iv) Add premix from step 1 to cooled mixture and mix until mixture is uniform.
v) Store resin matrix at −18° C.

The resin was then cast into a film and subsequently into a prepreg using technologies well known to those skilled in the art. Two different prepregs were made, one containing the inventive matrix resin and the second, for comparison purposes, being the M10R matrix system that is commercially available from Hexcel. The reinforcement used was E-glass roving, type 111AX11-2400 available from Owens Corning S.A., Brussels, Belgium. The prepreg assembly had a fiber aerial weight of 300 gsm and a resin content of 31% based on total weight of the prepreg assembly, i.e. fibrous reinforcement and resin.

A cured composite material of each type of prepreg was prepared from thirteen plies or layers of prepreg, each ply being 300 mm length in the 0° direction×250 mm wide, that were assembled together and prepared for autoclave cure as described in the Prepreg Technology Handbook available from Hexcel Composites Ltd. (Duxford, England). The assembly was cured for 15 minutes at 170° C. using a heat up rate of 2° C/min. An autoclave pressure of 7 bar was used. A full vacuum was applied initially and reduced to −0.2 bar when the positive pressure exceeded 1 bar.

The two cured composite materials were subjected to a variety of tests in order to ascertain how their physical and mechanical properties differed. The results are summarized in Table 1.

TABLE 1

(Physical &Mechanical data generated for a fiber reinforced laminate including M10R resin and the resin of Example 1.)

| Property | Units | M10R (Prior Art) | Example 1 |
|---|---|---|---|
| Tg (E') | ° C. | 130 | 146 |
| Tg (tan δ) | ° C. | 147 | 166 |
| ILSS | MPa | 79.4 ± 1.8 | 91.7 ± 1.2 |
| UFS | MPa | 1950.5 | 1850.6 |
| Fatigue | No of cycles at 90° C. | 43,900 | 500,000 |

Dynamic mechanical thermal analysis (DMTA) was used to observe the glass transition temperature of cured composite materials. Rectangular DMTA specimens, of nominal dimensions 40×5×2 mm, were cut using a diamond tipped water cooled wheel saw. Dynamic storage modulus (E') and damping (tan δ) were measured in a TA 2980 dynamic mechanical analyser fitted with a single cantilever head. Dynamic scans were performed at a heating rate of 5° C./min over the temperature range 50° to 250° C. at a frequency of 1 Hz.

Interlaminar shear strength (ILSS) specimens, of nominal dimensions 20×10×2 mm, were cut using a diamond tipped water cooled wheel saw. The ILSS was determined using a Zwick 1445 automated test machine with 3.175 mm radii load nose and supports. The samples were tested at 1 mm/min.

Ultimate flexural strength (UFS) specimens, of nominal dimensions 100×10×3 mm, were cut using a diamond tipped water cooled saw. The UFS was determined using a Zwick 1445 automated test machine with a 12-15 mm radius load nose and 5 mm radii supports. The span between the supports was 50 mm. The samples were tested at 5 mm/min.

Rectangular fatigue specimens, of nominal dimensions 95×10×3 mm, were cut using a diamond tipped water cooled wheel saw. The support radius was 2.5 mm and the span between the supports was 60 mm. The loading nose radius was 5 mm. Tests were performed at 90° C. at a frequency of 20 Hz. A stress of 850 MPa (467+/−383 MPa) was applied to the specimens. Tests were terminated following 500,000 cycles. Specimens withstanding 500,000 cycles were deemed to have excellent fatigue properties.

Examination of the data in Table 1 shows that a notable increase in the Tg and ILSS of the cured composite material including the matrix resin of Example 1 was achieved relative to that including the M10R resin. There is no obvious difference in the UFS of the cured composite, as this is a mechanical property, which is determined largely by the fibrous reinforcement. Incorporation of 2.5% by weight $SiO_2$ (6.25% Nanopox 400 by weight of formulation) significantly increased the number of fatigue cycles at 90° C. that the laminate could withstand relative to the M10R cured composite material.

By way of comparison, the present invention was compared with cured composite materials including resin matrices employing what are considered to be conventional approaches for enhancing fatigue performance. These include modifying the matrix resin with rubber (CTBN), thermoplastic resin (EP820) or brominated resin (DER560). The fatigue performance of a cured material including a resin of one of the aforesaid formulating options was determined under a flexural load of 850 MPa (467+/−383 MPa) at a frequency of 20 Hz and a test temperature of 90° C. The results are exemplified in table 2:

TABLE 2

| Fatigue Performance Additive | Additive loading (% wt of formulation) | Fatigue Performance (No. of cycles) |
| --- | --- | --- |
| Rubber (CTBN adduct) | 5.0 | <100,000 |
| Thermoplastic resin (phenoxy) | 5.0 | <200,000 |
| Brominated Bis -A epoxy resin | 22.1 | <300,000 |
| Nano-silica | 2.5 | >500,000 |

The improvements achieved in fatigue performance of cured composite materials including 'conventional approach' resin matrices are modest when compared to those achieved using a resin matrix comprising at least one inorganic nano-scale particulate.

Tests were conducted to determine fatigue performance of similar high Tg development systems with varying loadings of $SiO_2$. For M10R (Tg of about 130° C.), the number of cycles to failure was about 45 kc. For a similar system loaded with 15 percent $SiO_2$, the Tg was about 150° C. and the number of cycles to failure was about 500 kc. For a similar system loaded with 10 percent $SiO_2$, the Tg was about 149° C. and the number of cycles to failure was about 500 kc. For a similar system loaded with 5 percent $SiO_2$, the Tg was about 155° C. and the number of cycles to failure was about 490 kc. For a similar system loaded with 2.5 percent $SiO_2$, the Tg was about 147° C. and the number of cycles to failure was about 500 kc. For a similar system loaded with 1.25 percent $SiO_2$, the Tg was about 155° C. and the number of cycles to failure was about 105 kc.

As is apparent from the above test results, at loadings of 2.5% $SiO_2$ or higher, the fatigue performance achieved 500,000 cycles (repeat testing undertaken). The tests were terminated at this point. At loadings below 2.5% $SiO_2$, there is a drop in the gains achieved. However, at 1.25% $SiO_2$ the fatigue properties achieved are notably greater than those obtained from M10R.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A vehicle leaf spring comprising a structural fibrous reinforcement and a cured matrix resin composition, said cured matrix resin composition being made from an uncured matrix resin composition comprising: at least one thermoset resin component; at least one curative component; and at least one inorganic nano-scale particulate; said inorganic nano-scale particulate being present in a sufficient amount to enhance fatigue performance of the vehicle leaf spring; wherein said vehicle leaf spring exhibits a fatigue performance such that it achieves greater than 300,000 cycles under a flexural load of 850 MPa at 90° C.

2. A vehicle leaf spring according to claim 1 wherein said vehicle leaf spring exhibits a fatigue performance such that it achieves greater than 400,000 cycles under a flexural load of 850 MPa at 90° C.

3. A vehicle leaf spring according to claim 1 wherein said vehicle leaf spring exhibits a fatigue performance such that it achieves greater than 500,000 cycles under a flexural load of 850 MPa at 90° C.

4. A vehicle leaf spring according to claim 1 wherein said reinforcement comprises fibers selected from the group consisting of glass fibers, carbon fibers, graphite fibers, ceramic fibers and aramid fibers.

5. A vehicle leaf spring according to claim 1 wherein said thermosetting resin has a cured Tg of greater than 100° C.

6. A vehicle leaf spring according to claim 1 wherein said thermosetting resin has a cured Tg of greater than 120° C.

7. A vehicle leaf spring according to claim 1 wherein said thermosetting resin has a cured Tg of greater than 140° C.

8. A vehicle leaf spring according to claim 1 wherein said vehicle is selected from the group consisting of cars, trucks and buses.

9. A vehicle leaf spring according to claim 1 wherein said inorganic nano-scale particulate is present in an amount ranging from 2.5 wt % to 15 wt % of said thermoset resin component.

10. A vehicle leaf spring according to claim 1 wherein said inorganic nano-scale particulate comprises silica.

* * * * *